United States Patent Office 2,877,236
Patented Mar. 10, 1959

2,877,236
PHTHALIDYL ESTERS OF AROMATIC ACIDS

Donald D. Wheeler and David C. Young, Midland, Mich., assignors to The Dow Chemical Company, Midland, Mich., a corporation of Delaware No Drawing. Application August 3, 1956
Serial No. 602,071

5 Claims. (Cl. 260—343.2)

This invention is concerned with phthalidyl esters of aromatic acids having the formula

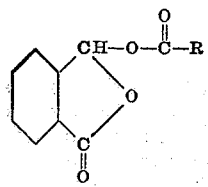

wherein R is an aryl radical. The term "aryl" has herein employed refers to aromatic radicals of the benzene series and is inclusive of phenyl and substituted phenyl such as p-nitrophenyl, p-tolyl, m-chlorophenyl, m-ethylphenyl and p-methoxyphenyl. The products of the present invention are light colored liquids or crystalline solids soluble in organic solvents such as acetone, ethanol and benzene and substantially insoluble in water. The new compounds are useful as antimicrobials adapted to be employed as toxicants in germicidal preparations.

The above compounds may be prepared by causing phthalaldehydic acid to react with a suitable mixed acid anhydride have the structure

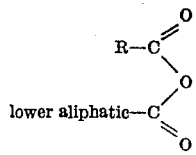

to produce the desired phthalidyl ester of an aromatic acid and an aliphatic acid by-product. It is convenient to produce the mixed acid anhydride in the reaction mixture by causing a suitable aromatic acid to react with a lower aliphatic acid anhydride such as acetic anhydride and propionic anhydride. The mixed anhydride so formed then reacts with phthalaldehydic acid to produce the phthalidyl ester and the aliphatic acid by-product. The term "phthalidyl" refers to the radical

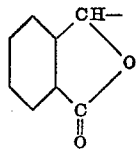

obtained by removing the hydroxyl group from the structure of phthalaldehydic acid. The term "phthalaldehydic acid" and "3-hydroxyphthalide" refer to a compound having the structure

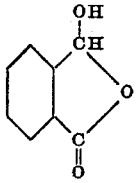

Phthalaldehydic acid is often represented in the literature as having the structure

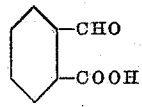

However, the acid employed in this invention and prepared as hereinafter described exists almost entirely in the 3-hydroxyphthalide ring structure, as indicated by a study of its infrared absorption spectrum. Infrared data also indicate the phthalide products to have the ring structure.

In the synthesis, good results are obtained when substantially equimolar proportions of the reactants are employed. The reaction takes place smoothly in the temperature range of from 90° to 200° C. Solvents such as benzene and toluene may be employed as reaction medium, if desired.

In a method for carrying out the reaction, phthalaldehydic acid, the appropriate aromatic acid and acetic anhydride or propionic anhydride are mixed together and heated to the reaction temperature. The heating is carried out over a period of from 1 to 3 hours. During the heating, a reaction takes place with the formation first of the mixed acid anhydride which then reacts with the phthalaldehydic acid to produce the desired phthalidyl ester of the aromatic acid and lower aliphatic acid by-product. The aliphatic acid is distilled from the reaction zone as it is formed and the desired phthalidyl ester product recovered as residue. The removal of the aliphatic acid is essential for the production of the phthalidyl ester of the aromatic acid in good yields and relatively free from phthalidyl ester of the lower aliphatic acid. After completion of the heating, the residue is poured into water to precipitate a phthalidyl ester of the aromatic acid. The precipitated product is recovered by filtration and purified by conventional procedures.

The following examples illustrate the invention but are not to be construed as limiting.

Example 1.—Phthalidyl benzoate 60 grams (0.4 mole) of phthalaldehydic acid, 55 grams (0.45 mole) of benzoic acid and 46 grams (0.45 mole) of acetic anhydride are mixed together and heated in the range of 150°–200° C. over a 2.5 hour period. During the heating, acetic acid distills from the mixture. The mixture is then cooled to 80° C. and poured into 800 milliliters of water whereupon an oil precipitates and solidifies when the mixture is stirred. This solid precipitate is collected by filtration and recrystallized from petroleum ether to obtain a phthalidyl benzoate product melting at 128.5°–130° C. The yield of the purified product is 50.0 grams or 48 percent of theoretical.

Example 2.—Phthalidyl 4-chlorobenzoate 60 grams (0.4 mole) of phthalaldehydic acid, 70.4 grams (0.45 mole) of 4-chlorobenzoic acid and 46 grams (0.45 mole) of acetic anhydride are mixed together and heated to 125°–180° C. over a 2.5 hour period. During the heating acetic acid distills from the mixture. The mixture is then cooled to about 80° C. and poured into 800 milliliters of water with stirring to precipitate a solid product. The mixture is filtered to obtain a crystalline phthalidyl 4-chlorobenzoate product having a molecular weight of 288.5.

Example 3.—Phthalidyl o-toluate 60 grams (0.4 mole) of phthalaldehydic acid, 61.2 grams (0.45 mole) of o-toluic acid and 46 grams (0.45 mole) of acetic anhydride are mixed together and heated to 140°–190° C. over a 2 hour period. During the heating, acetic acid distills from the mixture. The mixture is then cooled to about 80° C. and poured into 800 milliliters of water with stirring to precipitate a solid product. The mixture is filtered to obtain a phthalidyl o-toluate product having a molecular weight of 268.

*Example 4.—Phthalidyl 3-ethoxybenzoate*

60 grams (0.4 mole) of phthalaldehydic acid, 74.7 grams (0.45 mole) of 3-ethoxybenzoic acid and 58.5 grams (0.45 mole) of propionic anhydride are mixed together and heated to 150°–200° C. over a 3 hour period. During the heating, propionic acid distills from the reaction mixture. The mixture is then cooled to about 80° C. and poured into 800 milliliters of water with stirring to precipitate a solid product. The mixture is filtered to obtain a phthalidyl 3-ethoxybenzoate product having a molecular weight of 298.

In similar preparations the following phthalidyl esters may be prepared:

Phthalidyl 2-chlorobenzoate by the reaction of phthalaldehydic acid and 2-chlorobenzoic acid in the presence of propionic anhydride.

Phthalidyl 4-isopropylbenzoate by the reaction of phthalaldehydic acid and 4-isopropylbenzoic acid in the presence of acetic anhydride.

Phthalidyl 4-methoxybenzoate by the reaction of phthalaldehydic acid and 4-methoxybenzoic acid in the presence of propionic anhydride.

Phthalidyl 3-nitrobenzoate by the reaction of phthalaldehydic acid and 3-nitrobenzoic acid in the presence of propionic anhydride.

Phthalidyl 2,4-dichlorobenzoate by the reaction of phthaldehydic acid and 2,4-dichlorobenzoic in the presence of propionic anhydride.

Phthalidyl 3,5-dinitrobenzoate by the reaction of phthalaldehydic acid and 3,5-dinitrobenzoic acid in the presence of propionic anhydride.

Phthalidyl 2,4-dimethylbenzoate by the reaction of phthalaldehydic acid and 2,4-dimethylbenzoic acid in the presence of acetic anhydride.

The products of the present invention are useful as parasiticides adapted to be employed for the control of bacterial and fungal organisms. In a representative operation, a solid nutrient agar medium saturated with phthalidyl benzoate gave complete inhibition of growth when streaked with *Staphylococcus aureus* and *Rhizopus nigricans* and incubated at 30° C. for three days.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

We claim:

1. A phthalidyl ester of an aromatic acid having the structure

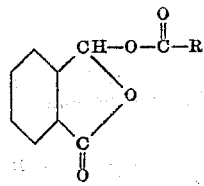

wherein R is selected from the group consisting of phenyl and substituted phenyl radicals wherein the substituent is selected from the group consisting of chloro, nitro, lower alkyl containing from 1 to 3 carbon atoms, inclusive, and lower alkoxy containing from 1 to 2 carbon atoms, inclusive.

2. Phthalidyl benzoate.
3. Phthalidyl 4-chlorobenzoate.
4. Phthalidyl o-toluate.
5. Phthalidyl 3-ethoxybenzoate.

References Cited in the file of this patent

Seekles: Recueil des trav. chim. des Pays-Bas, vol. 43, pp. 331–340 (1924).

Racine: Justus Leibig's Annalen der chemie, vol 239, pp. 78–91 (1887).

Mowry et al.: J. Am. Chem. Soc., 71, pp. 120–122 (1949).